(12) United States Patent
Parsley et al.

(10) Patent No.: US 11,449,130 B2
(45) Date of Patent: Sep. 20, 2022

(54) VISUAL AND INERTIAL MOTION TRACKING

(71) Applicant: Mo-Sys Engineering Limited, London (GB)

(72) Inventors: Martin Peter Parsley, London (GB); Michael Paul Alexander Geissler, London (GB)

(73) Assignee: MO-SYS ENGIN HERING LIMITED, London (GB)

( * ) Notice: Subject to any disclaimer, the term of this patent is extended or adjusted under 35 U.S.C. 154(b) by 0 days.

(21) Appl. No.: 16/634,125

(22) PCT Filed: Jul. 27, 2018

(86) PCT No.: PCT/GB2018/052128
§ 371 (c)(1),
(2) Date: Jan. 24, 2020

(87) PCT Pub. No.: WO2019/021017
PCT Pub. Date: Jan. 31, 2019

(65) Prior Publication Data
US 2020/0209954 A1    Jul. 2, 2020

(30) Foreign Application Priority Data

Jul. 27, 2017 (GB) .................................. 1712131.0

(51) Int. Cl.
*G06F 3/01* (2006.01)
*G06T 7/73* (2017.01)
(Continued)

(52) U.S. Cl.
CPC .......... *G06F 3/011* (2013.01); *G02B 27/0172* (2013.01); *G06F 3/017* (2013.01);
(Continued)

(58) Field of Classification Search
CPC .......... G06F 3/011; G06F 3/017; G06F 3/012; G06F 3/0304; G06F 3/04815;
(Continued)

(56) References Cited

U.S. PATENT DOCUMENTS

2002/0145563 A1* 10/2002 Kane ........................ G01S 5/04
                                                          342/442
2007/0248283 A1* 10/2007 Mack ...................... G06T 5/002
                                                          382/284
(Continued)

FOREIGN PATENT DOCUMENTS

CN           106774844 A      5/2017
EP           2962284 B1       6/2018
(Continued)

OTHER PUBLICATIONS

Second Examination Report from Great Britain application No. GB1712131.0, dated Oct. 21, 2020, pp. 1-5.
(Continued)

*Primary Examiner* — Jennifer N Welch
*Assistant Examiner* — Amy P Hoang
(74) *Attorney, Agent, or Firm* — Haynes & Boone LLP

(57) ABSTRACT

A motion tracking system for tracking the motion of a subject in an environment, the system comprising: an imaging device adapted to be worn by the subject; an accelerometer adapted to be worn by the subject; and a processor configured to receive a series of images of the environment captured by the imaging device and to form, in dependence on the images an estimate of the subject's position in the environment, and to receive acceleration data from the accelerometer and to, form an estimate of the motion of a part of the subject's body carrying the accelerometer in dependence on the acceleration data and the estimated position.

13 Claims, 2 Drawing Sheets

(51) Int. Cl.
*G02B 27/01* (2006.01)
*G06T 7/20* (2017.01)
*G06T 19/00* (2011.01)

(52) U.S. Cl.
CPC ............... *G06T 7/20* (2013.01); *G06T 7/74* (2017.01); *G06T 19/006* (2013.01); *G02B 2027/0138* (2013.01)

(58) Field of Classification Search
CPC . G06F 3/0346; G06T 7/74; G06T 7/20; G06T 19/006; G06T 7/337; G06T 17/00; G02B 27/0172; G02B 2027/0138; G02B 27/0093; G02B 27/017; G02B 27/32; A63F 13/211; A63F 13/212
See application file for complete search history.

(56) References Cited

U.S. PATENT DOCUMENTS

| | | | |
|---|---|---|---|
| 2009/0322763 A1 | 12/2009 | Bang et al. | |
| 2015/0116316 A1* | 4/2015 | Fitzgerald | G02B 27/017 345/419 |
| 2015/0260474 A1* | 9/2015 | Rublowsky | A63F 13/213 434/16 |
| 2015/0336013 A1* | 11/2015 | Stenzler | G06K 9/3216 700/90 |
| 2016/0005185 A1* | 1/2016 | Geissler | G06T 7/579 348/47 |
| 2017/0249745 A1* | 8/2017 | Fiala | A63F 13/213 |

FOREIGN PATENT DOCUMENTS

| | | |
|---|---|---|
| WO | 2015066037 A1 | 5/2015 |
| WO | 2015176163 A1 | 11/2015 |

OTHER PUBLICATIONS

Examination Report from Great Britain application No. GB1712131.0, dated Feb. 25, 2020, pp. 1-5.
International Search Report and Written Opinion from PCT Application No. PCT/GB2018/052128, dated Oct. 25, 2018 pp. 1-16.
Zheng et al., "Pedalvatar: An IMU-Based Real-Time Body Motion Capture System Using Foot Rooted Kinematic Model," 2014 IEEE/RSJ International Conference on Intelligent Robots and Systems, IEEE, 4130-4135.
Examination Report dated Feb. 22, 2021 issued in related European patent app. No. 18758665.6-1216 (7 pages).

* cited by examiner

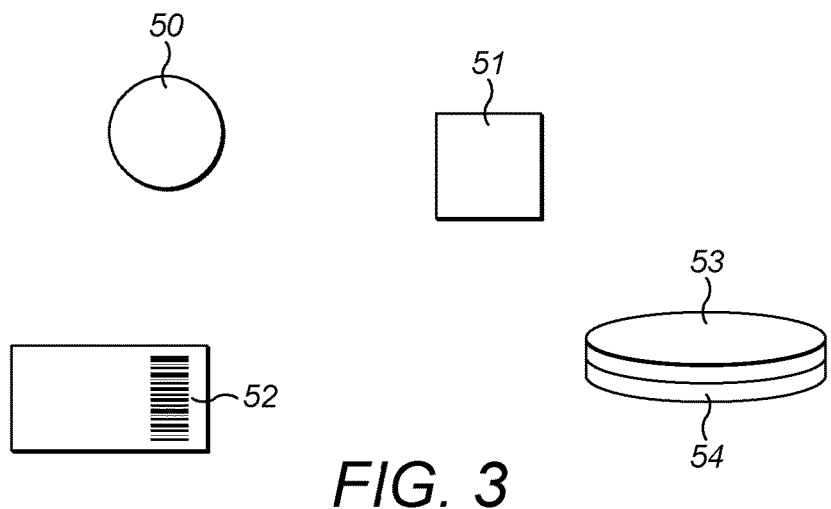
FIG. 3
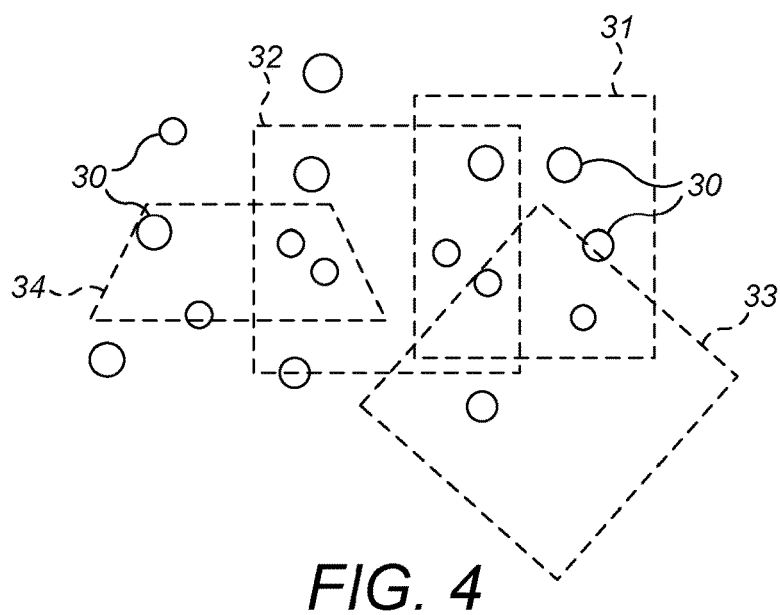
FIG. 4
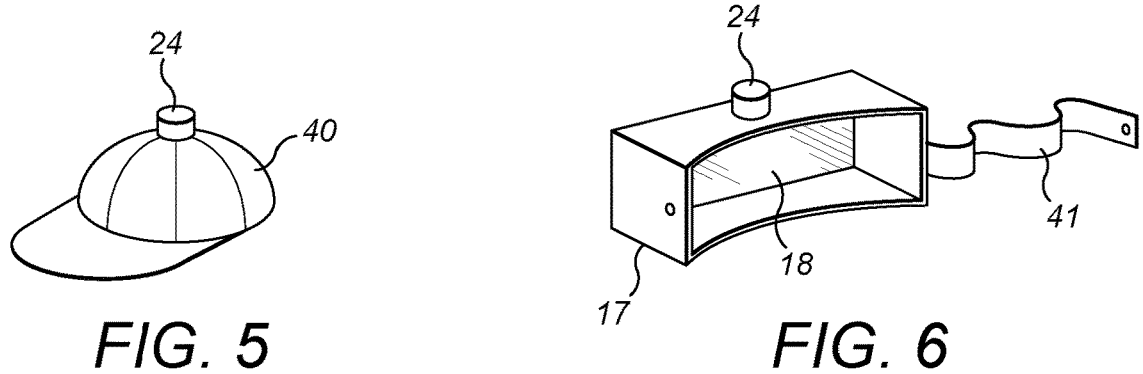
FIG. 5
FIG. 6

VISUAL AND INERTIAL MOTION TRACKING

RELATED APPLICATIONS

This application is a 371 National Stage of International Patent Application No. PCT/GB2018/052128 filed Jul. 27, 2018, entitled "VISUAL AND INERTIAL MOTION TRACKING," which claims priority to British Patent Application No. 1712131.0 filed Jul. 27, 2017, entitled "MOTION TRACKING," both of which are herein incorporated by reference in their entirety.

This invention relates to tracking the motion of a human or animal, for example for informing animation or virtual reality simulations or for providing inputs to a control system.

Systems are known for measuring motions of the body and limbs of a subject human or animal. One use of these systems is to gather information on the subject's typical movements. That information can be used to help define the motions of characters in animated graphics, as in computer games for instance. Another use of the information is to allow a subject's specific motions to influence the operation of a system. For example, the subject may participate in a game in which an animated character moves in real time to simulate the subject's motions. The subject may have a virtual reality headset, and the images shown on the headset may change in response to the subject's motions. The subject's motions as detected by the system may also be used to control an item of physically mobile equipment such as an industrial robot.

One way to detect the subject's motion is to attach accelerometers to various parts of the subject's body. For example, they may be attached at the feet, knees, hips, shoulders, elbows, hands and head. The accelerometers detect accelerations of the body part where they are mounted. The resulting data gives an indication of the motions of the individual body parts and also, for example by averaging the motions detected by all the accelerometers, of the subject's body as a whole. The accelerometers may be attached to an item of clothing, such as an elasticated suit, which is worn by the subject. Alternatively, an inertial measurement unit (IMU) comprising one, all or a combination of gyroscopes, accelerometers, magnetometers, and barometers can be used.

Another way to detect the subject's motion is by using an acoustic transmitter with a set of acoustic receivers placed at fixed locations around the environment where the subject is to be located. The system measures the time taken for signals transmitted from the object to be received at a number of the receivers. Then, by correlating the time of flight from the transmitter to each of those receivers with the location of the receivers the position of the subject can be estimated in three dimensions. An example of this type of system is the Sarissa Local Positioning System. In a similar way, other systems employ a radio transmitter carried by the subject to be measured, which cooperates with multiple radio receivers located around the environment or carried by other subjects. The radio receivers may detect any of a range of parameters (for example time-of-arrival, time-difference-of-arrival, angle-of-arrival or signal strength) of radio signals sent by the transmitter. Using these parameters the location of the transmitter relative to the receivers can again be estimated.

Other systems for detecting body motion are known. For example, the Microsoft Kinect system detects motion from images of a subject.

EP 2 962 284 discloses a system for detecting the motion of a device such as a movie camera. This may be used, for instance, to overlay simulated graphics on the output of the video camera.

There is a need for an improved system for sensing the motions of human and animal subjects.

According to one aspect there is provided a motion tracking system for tracking the motion of a subject in an environment, the system comprising: an imaging device adapted to be worn by the subject; an accelerometer adapted to be worn by the subject; and a processor configured to receive a series of images of the environment captured by the imaging device and to form, in dependence on the images an estimate of the subject's position in the environment, and to receive acceleration data from the accelerometer and to, form an estimate of the motion of a part of the subject's body carrying the accelerometer in dependence on the acceleration data and the estimated position.

The processor may be configured to detect in the images the representation of each of a plurality of indicia located in the environment and form the said estimate of position by comparing the locations of representations of the indicia in images captured at different times.

The processor may be configured to detect the representation of each of the indicia in the image as a relatively high brightness region of the image.

The motion tracking system may comprise a plurality of indicia disposed in an irregular pattern in the environment. The indicia may be retroreflective. The indicia may be substantially identical. The indicia may be located on a downwards-facing surface of the environment.

The imaging device may be fixed to an article of headgear. The imaging device may be fixed to the article of headgear in an orientation such that when the headgear is worn normally with the wearer's head in an upright orientation the centre of the imaging device's field of view is directed upwards. The article of headgear may be a hat. The article of headgear may be a headset comprising a display visible to a wearer of the headset.

The processor (which may be a second processor) may be configured to cause an image on the display to pan and/or tilt and/or roll in correspondence with motion of the subject's head as detected by the processor. The processor (which may be a second processor) may be configured to cause an image on the display to display a virtual reality image of an environment simulating motion through the environment in correspondence with motion of the subject as detected by the processor.

The motion tracking system may comprise a processor configured to cause a display to display an image of a figure in a simulated environment, wherein the location at which the figure is displayed in the simulated environment is determined in dependence on the estimate of the subject's position in the environment determined by means of images from the imaging device and the pose in which the figure is displayed is dependent on the acceleration data determined by means of acceleration data from the accelerometers.

According to another aspect, there is provided a method for tracking the motion of a subject in an environment, the method comprising: sensing by means of a imaging device worn on a first part of the body of the subject a series of images of the environment; sensing by means of an accelerometer worn on a second part of the body of the subject a series of accelerations, the second body part being articulated with respect to the first body part; forming, in dependence on the images, an estimate of the subject's position in the environment; forming an estimate of the motion of the second body part in dependence on the acceleration data and the estimated position.

The an estimate of the motion of a part of the subject's body carrying the accelerometer may be formed by (i) integrating accelerations measured by the accelerometer between a first time and a second time to form an estimate of the positional offset of the accelerometer at the second time relative to its position at the first time and forming the sum of that estimate of positional offset, a position determined by means of the imaging device at the first time and a predetermined positional offset; and (ii) integrating accelerations measured by the accelerometer between the first time and a third time (which may be done by integrating the accelerations between the second time and the third time and adding that to the said estimate of positional offset) to form a second estimate of the positional offset of the accelerometer at the third time relative to its position at the first time and forming the sum of that estimate of positional offset, the position determined by means of the imaging device at the first time and the predetermined positional offset; and comparing the two sums. The predetermined positional offset may be formed by estimating the positional offset between the imaging device and the accelerometer at the first time. between; and in dependence on the acceleration data and the estimated position.

The present invention will now be described by way of example with reference to the accompanying drawings. In the drawings:

FIG. 3 shows examples of indicia.

FIG. 4 shows a pattern of indicia in an environment and frames captured by an imaging device such as a camera.

FIGS. 5 and 6 show examples of headgear incorporating cameras.

Figure 1:
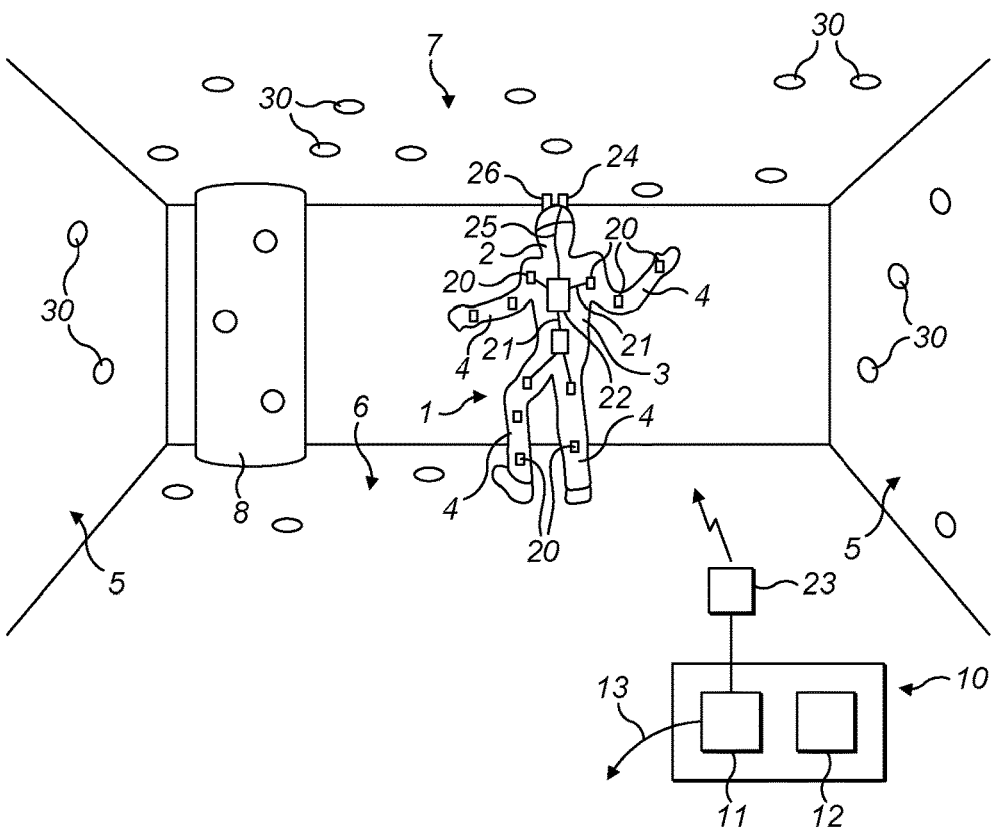
FIG. 1 is a schematic diagram of a system for sensing the motion of a subject.

FIG. 1 shows a subject 1. In this example the subject is a human, but the subject could be an animal such as a dog or a horse. The subject has a head 2, a torso 3 and limbs 4.

The subject is in an environment which contains and/or is bounded by a number of objects which are static with respect to the environment. In this example the objects are walls 5, floor 6 and ceiling 7 bounding the environment, and a pillar 8 located in the environment. Each of the static objects has a surface which is exposed to the environment.

The subject is equipped with motion capture apparatus for sensing the motion of the subject's body. The motion capture apparatus will be described in more detail below. Data from the motion capture apparatus is passed to a controller 10. The controller 10 can process that information to generate outputs such as a stream of position estimates, a video stream (optionally in conjunction with another processor 15) or motion demands to a robot or another item of mobile equipment.

Figure 2:
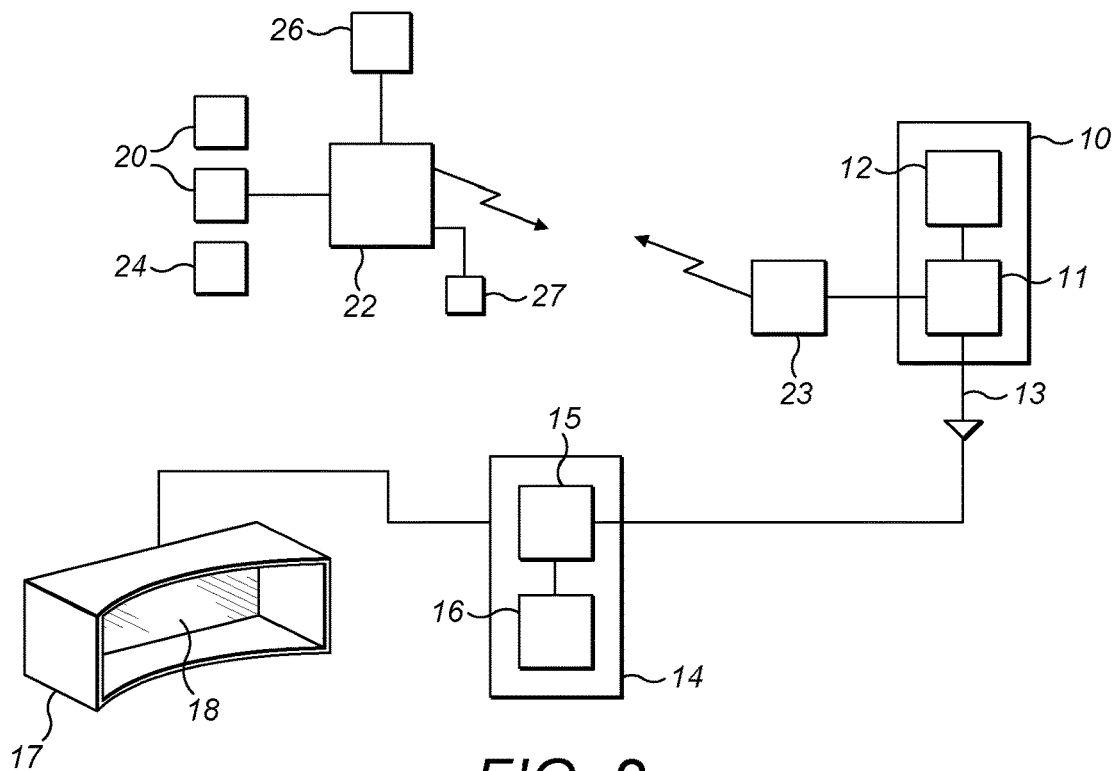
FIG. 2 is a simplified diagram of motion capture apparatus.

The motion capture apparatus is shown schematically in FIG. 1 and in architectural form in FIG. 2. Like reference numerals are used to designate like parts in each figure.

Accelerometers 20 are affixed to various locations on the subject's body. Conveniently the accelerometers may be affixed substantially at articulations of the subject's limbs. For example one or more accelerometers may be affixed near any one or more of the subject's hips, knees, ankles, shoulders, elbows or wrists. Alternatively or in addition one or more accelerometers may be attached part-way along a limb. One or more accelerometers may be attached to the subject's head. When an accelerometer is attached to a body part it is preferably attached in such a way that it is constrained to move with that body part. This may be done by the accelerometer being attached to the body part by adhesive, or by adhesive tape, or by elastic or clip-fastened straps or by it being fixed to an article of clothing such as an elasticated and/or close-fitting body suit.

The accelerometers may be of any suitable type. They may be gyroscopic and/or inertial force accelerometers. Each accelerometer preferably measures accelerations in three orthogonal axes. The data gathered by the accelerometers is passed to the control unit 10. The data may go via cables running to the control unit, or the accelerometers may be connected by cables 21 to a wireless communication device 22 carried by the subject. Device 22 may, for example be a smartphone. That device may then forward the data wirelessly to a terminal 23 coupled to the controller. The data from the accelerometers permits the controller to estimate the motion of each of the subject's limbs, and preferably of parts of each limb. There may be an accelerometer attached to the subject's torso, whereby the controller can estimate the motion of the torso. The controller can integrate the measured accelerations received from each accelerometer to estimate the position of the respective body part to which that accelerometer is attached with respect to an initial reference position. However, it is problematic to estimate position in this way at a large scale because inaccuracies in the measured accelerations accumulate over time. Also, the initial position of each body part or even of the subject's body as a whole relative to the environment might not be known.

In the system of FIG. 1, indicia 30 are applied to the objects 5 to 8 in the environment. The indicia are preferably of an appearance that is readily distinguishable from the environment. For example, they may be of very high reflectivity (e.g. of retroreflective material) or of very low reflectivity (e.g. having a matt black surface coating), or they may be of a defined colour, for example a specific green. When the indicia are of high reflectivity, preferably each one is of a material that reflects preferentially in a direction orthogonal to its major plane, as may be the case with dedicated retroreflective materials. When the indicia 30 are of high reflectivity, more preferably each one is of a material that reflects preferentially in a direction parallel to the incoming light source. The indicia are preferably flat: for example, they may be in the form of laminar stickers applied to the surfaces of the objects 5 to 8. This can make them easy to apply in the environment. The indicia preferably bear no surface markings (e.g. numbers or bar codes) by which each one can be distinguished from the others. This can make the task of applying the indicia in the environment easier. The indicia may all have the same outline (e.g. round or square) or they may have different outlines. The indicia are positioned in an irregular pattern. The pattern is preferably non-repeating. This may be achieved by randomly positioning the indicia in the environment. Positioning the indicia in an irregular pattern can make the task of applying the indicia easier and also facilitates locating the subject in the environment, as will be described below. The indicia may all be of the same size, which may help their range to be determined as will be described further below, or of different sizes. In summary, in a preferred arrangement the indicia are provided by identical retroreflective stickers which are applied to the environment in an irregular or random pattern.

FIG. 3 shows examples of indicia. The indicia could be round (see 50), square (see 51) or of other shapes. The indicia could bear markings such as barcode 52 or one or more holes which allow any of the indicia to be distinguished uniquely from the others, or they may bear no such markings. The markings may be positioned in an irregular pattern on the indicia 30. Some of the indicia 30 may be positioned in known locations. Conveniently the indicia take the form of stickers having an upper surface 53 of a predetermined colour and/or reflectivity and a lower adhesive surface 54 by means of which they may be adhered to the environment.

The indicia may be located on upwards-facing, downwards-facing or sideways-facing surfaces of the environment. It is preferred that at least some of the indicia are located on downwards-facing surfaces, e.g. ceiling 7. Such a downward-facing surface may be above the subject 1. Visibility of indicia located above the subject is typically better than of indicia located sideways of or below the subject because it is less likely to be obstructed by other objects or people.

The subject carries an imaging device such as camera 24. The camera is attached to a part of the subject's body. The camera is preferably attached in such a way that it is constrained to move with that body part. This may be done by the accelerometer being attached to the body part by adhesive, or by adhesive tape, or by elastic or clip-fastened straps or by it being fixed to an article of clothing such as an elasticated and/or close-fitting body suit or an item of headgear such as a hat, a hood, glasses, a headset or a headband. The camera is configured to capture images in a direction generally away from the subject's body. Images, e.g. video frames, gathered by the camera are passed to the control unit 10. The data may go via cables running to the control unit, or the camera may be connected by cable 25 to the wireless communication device 22 carried by the subject. That device may then forward the data wirelessly to the terminal 23 coupled to the controller. Optionally the camera may be integrated with the communication device 22. When the camera is fixed to an item of headgear, preferably it is fixed in such an orientation that when the headgear is worn in the normal way by a subject whose head is upright the camera will be directed upwards.

The camera and the indicia enable the controller to estimate the location of the camera in the environment. The manner in which this is achieved will now be described with reference to FIG. 4.

The camera 24 captures a series of frames. The direction in which the camera is pointing when it captures a frame depends on how the subject's body is positioned at that time, and specifically on the position and orientation of the part of the body to which the camera 24 is attached. FIG. 4 shows indicia 30 in an irregular pattern, and a set of outlines 31, 32, 33, 34 indicating the boundaries of frames captured by camera 24. Controller 10 comprises a processor 11 and a memory 12. The memory stores in non-transient form a set of instructions executable by the processor to perform its functions. The processor receives the successive frames captured by the camera. The processor analyses each frame to detect the locations of the indicia 30 as represented in the frame. The indicia may be detected through their characteristic brightness, shape, colour or a combination of those factors. For example, in the case of retroreflective indicia the indicia may be indicated by particularly bright pixel groups in the image.

By comparing the position and layout of the indicia as detected in successive frames the processor can (a) build up a map of the pattern or constellation formed by the indicia and (b) infer the motion of the camera between frames. For illustration, suppose at a first time the camera captures the image indicated at 31. The processor 11 identifies the indicia 30 in that image. The indicia can be considered to lie on vectors extending from the camera and intersecting the locations of the indicia as represented in image 31. At this stage the ranges of the indicia from the camera are not known. At a second time the camera captures the image indicated at 32. Some indicia are common to images 31 and 32. Because the indicia are positioned irregularly it can be assumed that the relative positions of the indicia found in each frame are unique in the field of indicia. By comparing the positions of the images of indicia in successive frames the processor can build up a record of where in a three-dimensional space the actual indicia are. For example, because three indicia 30 appear in a common spatial relationship in frames 31 and 32 it can be inferred that the camera has undergone translation between those images without rotation or tilting. Comparison of the positions of the indicia in frame 33 with those in the other frames 31, 32 whose fields of view overlap frame 33 permit the processor 11 to infer that the camera was rotated about its primary axis before frame 33 was captured. Comparison of the positions of the indicia in frame 34 with those in the other frames (e.g. 32) whose fields of view overlap frame 34 permit the processor 11 to infer that the camera was tilted before frame 33 was captured. Similarly, motion of the camera towards or away from the field of indicia can be detected through scaling of the detected positions of the indicia between successive frames.

The accuracy of this positioning method can be improved if the camera has a relatively wide field of view and/or if the density of the field of indicia is such that numerous indicia can be expected to be captured in each frame. That makes it less likely that there will be positional ambiguity due to multiple indicia accidentally having a similar positional relationship and therefore being confused as between images. That also reduces the influence of other objects that might appear similar to indicia (e.g. lights) and that might move. In solving for the position of the camera, the processor 11 searches for the best fit to the collected data, but that fit might not be perfect: for example it might not fit to a mobile light that has been mistakenly identified as one of the indicia.

The position of indicia in an image indicates the direction of those indicia with respect to the camera but not necessarily their distance from the camera. It may be possible for the processor 11 to infer the distance to indicia from the size with which they appear in the image. Alternatively, or in addition, the distance to indicia may be inferred from the changes in the imaged positions of indicia as between frames. The processor solves a multi-variable problem in which the relative directions from the camera to the indicia in successive frames are known. The processor determines a map of the indicia that provides the best fit to the information collected in successive frames as to the directions of indicia from the camera. Having formed the map, it estimates the position of the camera with reference to that map by identifying a position and orientation from which a view of the mapped indicia would be expected to best match the indicia as identified in the latest image from the camera. This problem can be simplified if it is known with greater confidence that the same one of the indicia as is represented at a location in a first frame is also represented at a location in a second frame. This relationship can be achieved by one or both of: (i) the rate at which the frames are captured being sufficiently high that one or more indicia will typically appear in successive frames, and can therefore be tracked by the processor; and (ii) the processor searching for common spatial patterns among the indicia as imaged, which indicate that the same set of indicia have been imaged in different frames.

It would be possible for the processor 11 to be pre-programmed with the locations of the indicia, but it has been found that with a constellation of indicia of suitable density this is not necessary because the processor can learn their locations satisfactorily. The pre-programmed locations of the indicia 30, may be the result of a map created a priori by another processor 11 having learnt the locations of the indicia 30.

It would be possible for the indicia to be provided with distinctive markers, to help the processor distinguish the images of different indicia from each other. Those could for example be numbers or bar codes, or the shape or colour of different indicia may differ so that they can be differentiated.

Using the process described above, the processor 11 detects and tracks motion of the camera. The camera is fixed with respect to a first part of the subject's body. Thus the processor can track the motion of that part of the body. The positions of other parts of the subject's body can be estimated from the accelerometers 20. In a preferred arrangement the processor synthesises the estimated position of the first part of the subject's body (as determined by means of the camera 24) and the estimated motions of the other parts of the subject's body (as determined by means of the accelerometers 20) to improve its estimate of the position of those other body parts. For example, instead of simply integrating the motions detected by the accelerometers to establish their position over time, the determined positions of those other body parts may be re-based in dependence on a position determined by means of the camera. This may be done in a number of ways. In one embodiment, the time-averaged position of a part of the body may be assumed to have a predetermined constant offset from the position of the camera. The estimated position of that body part may be refined by adding to the positional estimate as determined by the accelerometer on that body part an offset determined so as to bring the positional estimate closer to the predetermined constant offset from the currently estimated camera position. The predetermined constant offset may be determined in dependence on which part of the body is under consideration and optionally the morphology of the subject. In another example, the positional estimate from the camera is used to estimate the location of the subject and their body parts relative to the environment. This can help to address the problem the accelerometers alone only provide positional information relative to an initial position, which from the accelerometers alone might be unknown. In this arrangement, the camera provides an estimate of the position of the subject in the environment. In one convenient arrangement, an initial estimate is made of the relative positions of the subject's limbs. This may be done by the subject posing in a predetermined way at a calibration time prior to normal use. The predetermined pose may, for example, be standing upright. If the position of the camera relative to the environment is known at the time when the reference pose is adopted then subsequent motions of the subject's body parts as determined by the accelerometers can be related to the environment by adding, for a body part, (i) a position relative to that reference pose as determined by integration of the accelerations sensed by each accelerometer subsequent to the reference pose, (ii) a predetermined spatial offset from the camera for that body part, which is dependent on the form of the reference pose and (iii) the position of the camera in the environment at the time of the reference pose. In another alternative, instead of the subject adopting a reference pose at the time of calibration, the subject's pose at the time of calibration may be estimated by the processor 11 in dependence on an image of the subject at that time captured by a camera in the environment directed at the subject.

The processor 11 may transmit the determined positions of the subject's body and its parts via link 13 to another device 14 (see FIG. 2). That device may use the data to control equipment such as a display or a physically movable device such as a robot in dependence on the determined positions. In one example, the device 14 controls a video display in dependence on the determined positions. This may be done in several ways. In a first arrangement, the control device 14 controls a display to show a simulation of the subject 1. The simulation may, for example, be a representation of a human or animal the motions of which correspond to the detected motions of the subject 1. In another arrangement, the control device 14 controls a display 18 on a device such as headset 17 that is presumed to be carried by the subject 1. In this arrangement, the control device 14 controls the headset to display an image that changes in correspondence with the motions of the subject 1 so as to provide the subject with a virtual reality experience. Thus the headset 17 may be a virtual reality headset controlled in response to the estimated positions as determined by controller 10. The control device 14 may comprise a processor 15 and a memory 16 storing in a non-transient way instructions that are executable by the processor to perform its functions.

One or more of the units 10, 14 and 22 may be integrated together. Alternatively they may be remote from each other.

In order for the camera 24 to have the most reliable view of the constellation of indicia 30 it is preferred that the camera is located so that for normal positions of the subject 1 the camera is directed upwards. To achieve this the camera may conveniently be mounted to an item of headgear. FIG. 5 shows a hat 40 carrying the camera 24. FIG. 6 shows that the camera 24 may be attached to the virtual reality headset 17. The virtual reality headset may be worn by being attached around the subject's head by means of strap 41.

A lamp 26 may be located near the camera 24. Preferably the lamp is configured to shine in generally the direction the camera is pointing, so as to illuminate the field of view of the camera. The lamp may be fixed to the camera. When the camera 24 is fixed to an article of clothing, such as an item of headgear, the lamp may be fixed to the same item of clothing. The lamp may emit visible or invisible (e.g. ultraviolet or infrared) light. The light emitted by the lamp is preferably of a wavelength that the camera can detect. When the lamp is operational it may illuminate the field of view of the camera. This may make it easier for the controller 10 to distinguish the indicia. For example, when the indicia are of retroreflective material they may show up as especially bright regions of images captured by the camera due to their reflecting the light from the lamp.

The equipment carried by the subject may conveniently be powered by a battery 27 also carried by the subject.

A further approach to calibrating the location of an object such as one of the accelerometers is to contact the object with a point whose location is known. The time when the object is contacted with the known location may be signalled to the controller 10, and subsequent accelerations can be integrated to provide a position offset from that known location. The known location may be fixed, or it may be a point on a moveable probe, for example a handheld probe, whose location can be sense by means such as laser ranging, measuring the angles of joints on links extending between the probe and a base or by means of a camera such as 24. The unit may alternatively be used for continuous calibration of the location of such objects and sensors.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A motion tracking system for tracking a motion of a subject in an environment, the system comprising:
   an imaging device adapted to be worn by the subject;
   an accelerometer adapted to be worn by the subject; and
   a processor configured to receive a series of images of the environment captured by the imaging device and to form, in dependence on the images an estimate of the subject's position in the environment, and to receive acceleration data from the accelerometer and to form an estimate of a motion of a part of the subject's body carrying the accelerometer in dependence on the acceleration data and the estimate of the subject's position, wherein the processor is configured to
   detect in the series of images from the imaging device a representation of each of a plurality of indicia located in the environment, the indicia not having a known position and wherein the imaging device captures the series of images at a framerate such that one or more of the plurality of indicia will appear in successive frames of the series of images;
   search for common spatial patterns among representations of the plurality of indicia by comparing position and layout of the plurality of indicia in the series of images; and
   form the estimate of the subject's position with reference to the common spatial patterns among representations of the plurality of indicia in the series of images captured at different times, and
   wherein the plurality of indicia is disposed in an irregular pattern in the environment.

2. The motion tracking system as claimed in claim 1, wherein the processor is configured to detect the representation of each of the indicia in the image as a relatively high brightness region of the image.

3. The motion tracking system as claimed in claim 1, wherein the indicia are retroreflective.

4. The motion tracking system as claimed in claim 1, wherein the indicia are substantially identical.

5. The motion tracking system as claimed in claim 1, wherein the indicia are located on a downwards-facing surface of the environment.

6. The motion tracking system as claimed in claim 1, wherein the imaging device is fixed to an article of headgear.

7. The motion tracking system as claimed in claim 6, wherein the imaging device is fixed to the article of headgear in an orientation such that when the headgear is worn normally with a wearer's head in an upright orientation a centre of the imaging device's field of view is directed upwards.

8. The motion tracking system as claimed in claim 6, wherein the article of headgear is a hat.

9. The motion tracking system as claimed in claim 6, wherein the article of headgear is a headset comprising a display visible to a wearer of the headset.

10. The motion tracking system as claimed in claim 9, wherein the processor is configured to cause an image on the display to pan and/or tilt and/or roll in correspondence with motion of the subject's head as detected by the processor.

11. The motion tracking system as claimed in claim 9, wherein the processor is configured to cause an image on the display to display a virtual reality image of an environment simulating motion through the environment in correspondence with motion of the subject as detected by the processor.

12. The motion tracking system as claimed in claim 1, comprising a processor configured to cause a display to display an image of a figure in a simulated environment, wherein:
   a location at which the figure is displayed in the simulated environment is determined in dependence on the estimate of the subject's position in the environment determined by images from the imaging device; and
   a pose in which the figure is displayed is dependent on the acceleration data determined by acceleration data from the accelerometers.

13. A method for tracking a motion of a subject in an environment, the method comprising:
   sensing with an imaging device worn on a first body part of the subject a series of images of the environment;
   detecting in the series of images a representation of each of a plurality of indicia located in the environment, wherein the indicia are not of known position, and wherein the imaging device captures the series of images at a frame rate such that one or more of the plurality of indicia will appear in successive frames of the series of images;
   searching for common spatial patterns among representations of the plurality of indicia by comparing position and layout of the plurality of indicia in the series of images;
   sensing with an accelerometer worn on a second body part of the subject a series of accelerations, the second body part of the subject being articulated with respect to the first body part of the subject;
   forming, in dependence on the images, an estimate of the subject's position in the environment;
   forming the estimate of the subject's position with reference to the common spatial patterns among representations of the plurality of indicia in the series of images captured at different times; and
   forming an estimate of a motion of the second body part in dependence on acceleration data from the accelerometer and the estimate of the subject's position,
   wherein the plurality of indicia is disposed in an irregular pattern in the environment.

* * * * *